(12) United States Patent
Aggarwal et al.

(10) Patent No.: US 9,396,117 B2
(45) Date of Patent: Jul. 19, 2016

(54) INSTRUCTION CACHE POWER REDUCTION

(75) Inventors: Aneesh Aggarwal, Portland, OR (US);
Ross Segelken, Portland, OR (US);
Kevin Koschoreck, Tigard, OR (US)

(73) Assignee: NVIDIA CORPORATION, Santa Clara, CA (US)

(*) Notice: Subject to any disclaimer, the term of this patent is extended or adjusted under 35 U.S.C. 154(b) by 184 days.

(21) Appl. No.: 13/346,536

(22) Filed: Jan. 9, 2012

(65) Prior Publication Data

US 2013/0179640 A1    Jul. 11, 2013

(51) Int. Cl.
| G06F 12/00 | (2006.01) |
| G06F 13/00 | (2006.01) |
| G06F 13/28 | (2006.01) |
| G06F 12/08 | (2016.01) |

(52) U.S. Cl.
CPC ........ *G06F 12/0864* (2013.01); *G06F 12/0875* (2013.01); *G06F 2212/1028* (2013.01); *Y02B 60/1225* (2013.01)

(58) Field of Classification Search
CPC .................................................. G06F 12/0864
See application file for complete search history.

(56) References Cited

U.S. PATENT DOCUMENTS

| 4,168,541 A * | 9/1979 | DeKarske ................... 365/49.17 |
| 4,525,780 A * | 6/1985 | Bratt et al. ..................... 711/163 |
| 4,807,110 A * | 2/1989 | Pomerene et al. ............ 711/213 |
| 5,125,085 A * | 6/1992 | Phillips ........................ 711/122 |
| 5,325,503 A * | 6/1994 | Stevens et al. ................ 711/146 |
| 5,544,342 A * | 8/1996 | Dean ............................. 711/119 |
| 5,623,627 A * | 4/1997 | Witt .............................. 711/122 |
| 5,640,532 A   | 6/1997 | Thome et al. |
| 5,666,514 A * | 9/1997 | Cheriton ....................... 711/144 |
| 5,687,110 A   | 11/1997 | Tran et al. |
| 5,724,553 A * | 3/1998 | Shigeeda ...................... 711/170 |
| 5,737,765 A * | 4/1998 | Shigeeda .............. G06F 1/1616  710/10 |
| 5,784,590 A * | 7/1998 | Cohen et al. ................. 711/122 |

(Continued)

FOREIGN PATENT DOCUMENTS

| CN | 1659525    | 8/2005 |
| CN | 101523359  | 9/2009 |

(Continued)

OTHER PUBLICATIONS

The Design of Way-Prediction Scheme in Set-Associative Cache for Energy Efficient Embedded System, Tseng et al, WRI International Conference on Communications and Mobile Computing 2009 (CMC '09), Jan. 6-8, 2009 pp. 3-7 (5 pages).*

(Continued)

*Primary Examiner* — Sanjiv Shah
*Assistant Examiner* — Daniel C Chappell

(57) ABSTRACT

In one embodiment, a method for controlling an instruction cache including a least-recently-used bits array, a tag array, and a data array, includes looking up, in the least-recently-used bits array, least-recently-used bits for each of a plurality of cacheline sets in the instruction cache, determining a most-recently-used way in a designated cacheline set of the plurality of cacheline sets based on the least-recently-used bits for the designated cacheline, looking up, in the tag array, tags for one or more ways in the designated cacheline set, looking up, in the data array, data stored in the most-recently-used way in the designated cacheline set, and if there is a cache hit in the most-recently-used way, retrieving the data stored in the most-recently-used way from the data array.

21 Claims, 6 Drawing Sheets

(56) References Cited

U.S. PATENT DOCUMENTS

| | | | |
|---|---|---|---|
| 5,809,522 A * | 9/1998 | Novak et al. | 711/118 |
| 5,835,934 A * | 11/1998 | Tran | 711/3 |
| 5,845,317 A * | 12/1998 | Pawlowski | 711/128 |
| 5,848,428 A * | 12/1998 | Collins | 711/127 |
| 5,933,860 A * | 8/1999 | Emer et al. | 711/213 |
| 5,974,508 A * | 10/1999 | Maheshwari | 711/133 |
| 6,021,469 A * | 2/2000 | Tremblay et al. | 711/125 |
| 6,148,374 A * | 11/2000 | Pawlowski | G06F 12/123 |
| | | | 711/128 |
| 6,247,094 B1 * | 6/2001 | Kumar et al. | 711/3 |
| 6,279,107 B1 | 8/2001 | Tran | |
| 6,282,663 B1 | 8/2001 | Khazam | |
| 6,334,170 B1 * | 12/2001 | Pawlowski | G06F 12/0864 |
| | | | 711/128 |
| 6,356,990 B1 * | 3/2002 | Aoki | G06F 12/0864 |
| | | | 711/128 |
| 6,389,523 B1 * | 5/2002 | Shimazaki | G06F 12/0864 |
| | | | 711/167 |
| 6,601,161 B2 | 7/2003 | Rappoport et al. | |
| 6,678,792 B2 | 1/2004 | van de Waerdt | |
| 6,718,439 B1 * | 4/2004 | Jayavant | 711/136 |
| 6,978,149 B1 | 12/2005 | Morelli et al. | |
| 7,177,981 B2 * | 2/2007 | Davis | G06F 12/0846 |
| | | | 365/227 |
| 7,321,787 B2 | 1/2008 | Kim | |
| 7,360,023 B2 * | 4/2008 | Goodrich | G06F 12/0864 |
| | | | 365/226 |
| 7,369,815 B2 | 5/2008 | Kang et al. | |
| 7,412,570 B2 | 8/2008 | Moll et al. | |
| 7,437,513 B2 * | 10/2008 | Saida | G06F 12/0864 |
| | | | 711/128 |
| 7,475,192 B2 * | 1/2009 | Correale, Jr. | G06F 12/0851 |
| | | | 711/127 |
| 7,487,369 B1 * | 2/2009 | Gupta | G06F 1/3203 |
| | | | 711/118 |
| 7,536,510 B1 * | 5/2009 | Thompson | 711/128 |
| 7,644,294 B2 | 1/2010 | Raghuvanshi | |
| 7,689,772 B2 * | 3/2010 | Damaraju et al. | 711/128 |
| 7,904,658 B2 * | 3/2011 | Abadeer | G06F 12/0864 |
| | | | 365/226 |
| 8,028,180 B2 | 9/2011 | Bonanno et al. | |
| 8,335,122 B2 * | 12/2012 | Dreslinski, Jr. | G06F 12/0864 |
| | | | 365/226 |
| 8,352,683 B2 * | 1/2013 | Cohen | G06F 12/0859 |
| | | | 711/128 |
| 8,458,404 B1 * | 6/2013 | Delgross | G06F 12/0864 |
| | | | 711/128 |
| 8,775,740 B2 * | 7/2014 | Chinnakonda | G06F 9/3824 |
| | | | 711/128 |
| 2001/0026465 A1 * | 10/2001 | Choi et al. | G06F 12/0864 |
| | | | 365/49.1 |
| 2002/0080662 A1 * | 6/2002 | Yamazaki et al. | 365/200 |
| 2002/0112126 A1 * | 8/2002 | Hayakawa | G06F 12/0864 |
| | | | 711/128 |
| 2002/0138700 A1 | 9/2002 | Holmberg | |
| 2003/0003943 A1 | 1/2003 | Bajikar | |
| 2003/0156472 A1 * | 8/2003 | Satou et al. | 365/200 |
| 2004/0103253 A1 | 5/2004 | Kamei et al. | |
| 2004/0181654 A1 | 9/2004 | Chen | |
| 2005/0132175 A1 | 6/2005 | Henry et al. | |
| 2005/0239518 A1 | 10/2005 | D'Agostino et al. | |
| 2005/0246499 A1 * | 11/2005 | Saida | G06F 12/0864 |
| | | | 711/128 |
| 2007/0130450 A1 | 6/2007 | Chiao et al. | |
| 2007/0162775 A1 | 7/2007 | Raghuvanshi | |
| 2008/0082843 A1 | 4/2008 | Schuler et al. | |
| 2011/0055523 A1 | 3/2011 | Kaplan et al. | |
| 2011/0083030 A1 * | 4/2011 | Doi | G06F 12/0864 |
| | | | 713/601 |
| 2011/0093658 A1 | 4/2011 | Zuraski, Jr. et al. | |
| 2012/0079303 A1 | 3/2012 | Madduri | |
| 2012/0117362 A1 | 5/2012 | Bhargava et al. | |

FOREIGN PATENT DOCUMENTS

| | | |
|---|---|---|
| CN | 101763249 | 6/2010 |
| CN | 102103547 | 6/2011 |
| TW | I257546 | 9/2003 |

OTHER PUBLICATIONS

Optimizing for instruction caches, part 1, Kleen et al, EE Times, Oct. 29, 2007, retrieved from http://www.eetimes.com/document.asp?doc_id=1275470 on Jan. 28, 2007 (3 pages).*

Optimizing for instruction caches, part 2, Kleen et al, EE Times, Nov. 5, 2007, retrieved from http://www.eetimes.com/document.asp?doc_id=1275472 on Jan. 28, 2014 (3 pages).*

Optimizing for instruction caches, part 3, Livadariu et al, EE Times, Nov. 12, 2007, retrieved from http://www.eetimes.com/document.asp?doc_id=1275474 on Jan. 28, 2014 (3 pages).*

Storage Question 9: How does Storage Hierarchy work?, VanderLeest et al, Jan. 26, 2003, retrieved from https://web.archive.org/web/20030126153705/http://www.calvin.edu/academic/rit/webBook/chapter2/design/hardware/memory/memtradeoff.htm on Jan. 29, 2014 (2 pages).*

Definition of set associative cache, Free Online Dictionary of Computing, Oct. 18, 2004, retrieved from http://foldoc.org/set+associative+cache on Jan. 28, 2014 (2 pages).*

The Design of Way-Prediction Scheme in Set-Associative Cache for Energy Efficient Embedded System, Tseng et al, WRI International Conference on Communications and Mobile Computing 2009 (CMC '09), Jan. 6-8, 2009, pp. 3-7 (5 pages).*

Computer Architecture Techniques for Power-efficiency, Kaxiras et al, Morgan & Claypool Publishers, published 2008, ISBN 1598292080, pp. 101-107 (7 pages).*

An Accurate and Energy-Efficient Way Determination Technique for Instruction Caches by Early Tab Matching, Chung et al, 4th IEEE International Symposium on Electronic Design, Test and Applications 2008 (DELTA 2008), Jan. 23-25, 2008, pp. 190-195 (6 pages).*

Computer Architecture Techniques for Power-efficiency; Kaxiras et al; Morgan & Claypool Publishers; published 2008; ISBN 1598292080; pp. 101-107 (7 pages).*

Storage Question 9: How does Storage Hierarchy work?; VanderLeest et al; Jan. 26, 2003; retrieved from https://web.archive.org/web/20030126153705/http://www.calvin.edu/academic/rit/webBook/chapter2/design/hardware/memory/memtradeoff.htm on Jan. 29, 2014 (2 pages).*

Aggarwal, Aneesh et al., "Instruction Cache Power Reduction," U.S. Appl. No. 13/346,536, filed Jan. 9,2012, 32 pages.

Aggarwal, Aneesh et al., "Branch Prediction Power Reduction," U.S. Appl. No. 13/458,513, filed Apr. 27, 2012, 49 pages.

Inoue, K. et al.: A High-Performance and Low-Power Cache Architecture with Speculative Way-Selection. IEICE Trans. Electron., vol. E83-C, No. Feb. 2, 2000, pp. 186-194.

* cited by examiner

| WAY | L[2] | L[1] | L[0] |
|---|---|---|---|
| 0 | - | 0 | 0 |
| 1 | - | 1 | 0 |
| 2 | 0 | - | 1 |
| 3 | 1 | - | 1 |

FIG. 4

| WAY | L[2] | L[1] | L[0] |
|---|---|---|---|
| 0 | - | 1 | 1 |
| 1 | - | 0 | 1 |
| 2 | 1 | - | 0 |
| 3 | 0 | - | 0 |

FIG. 5

| CYCLE | 1 | 2 | 3 | 4 | 5 | 6 | 7 | 8 | 9 |
|---|---|---|---|---|---|---|---|---|---|
| FETCH ADDR | | | | | | | | | |
| REDIR | REDIRECT TO ADDR 0x080 | | | | | | | | |
| 0x080 | | ALL SET 2 TAGS<br>ALL SET 2 LOW DATA<br>LRU FOR SETS 0-3 | | 0x080 DATA AVAILABLE<br>MRU AVAILABLE | | | | | |
| 0xa0 | | | ALL SET 2 TAGS<br>ALL SET 2 HIGH DATA | | 0x0a0 DATA AVAILABLE | | | | |
| 0x0c0 | | | | ALL SET 3 TAGS<br>MRU SET 3 LOW DATA<br>LRU FOR SETS 4-7 | | 0x0c0 DATA AVAILABLE<br>MRU AVAILABLE | | | |
| 0x0e0 | | | | | ALL SET 3 TAGS<br>MRU SET 3 HIGH DATA | | 0x0e0 DATA AVAILABLE | | |
| 0x100 | | | | | | ALL SET 4 TAGS<br>MRU SET 4 LOW DATA | | 0x100 DATA AVAILABLE | |
| REDIR | | | | | | | REDIRECT TO ADDRESS 0x200 | | |
| 0x200 | | | | | | | | ALL SET 8 TAGS<br>ALL SET 8 LOW DATA<br>LRU FOR SETS 8-11 | 0x200 DATA AVAILABLE<br>MRU AVAILABLE |

FIG. 7

INSTRUCTION CACHE POWER REDUCTION

BACKGROUND

Microprocessors typically employ instruction caches to speed up retrieval and execution of instructions. The instruction cache typically acts as a buffer memory between a higher level of memory and a processor. When an instruction is fetched by the processor, the instruction is copied into the instruction cache for direct access by the processor. If the same instructions are used frequently in a set of program instructions, storage of these instructions in the instruction cache yields an increase in throughput because slower accesses of higher level memory are reduced.

For example, a set-associative instruction cache may include a data array and a tag array. The data array and the tag array may be combined to form cachelines or words that are organized in different ways within the instruction cache. When an address for an instruction fetch is generated, the instruction cache compares a tag field of the address to tag values currently stored in a corresponding cacheline set of the tag array. If a tag match exists, and the tag is valid (i.e., a cache hit), then that data is fetched from the location in the data array corresponding to the desired address. Since the data is retrieved directly from the instruction cache, speed is improved as a result of not having to access external memory.

In one example implementation of an instruction cache, when an address for an instruction fetch is generated, portions of the tag array and the data array that correspond to a set of cachelines that potentially match the address are activated in parallel. In other words, all ways in the tag array that correspond to the set of cachelines are activated and all addresses in the data array that correspond to the set of cachelines are activated. When the tag array and the data array are activated, the data array location that holds the data that corresponds to the instruction address is fetched and the data in the other activated locations is discarded. By activating all locations of both the tag array and the data array that correspond to the set of cachelines in parallel, an instruction fetch typically may be performed more quickly relative to a serial approach where all tag locations are activated to identify a matching data location in a clock cycle, and then a single location in the data array is activated to fetch the data in a subsequent clock cycle.

However, there are various limitations with these parallel and serial approaches for performing an instruction fetch. For example, in the parallel approach, since all data locations in the data array that correspond to the set of cachelines are activated to fetch data from only one location, power consumption is increased in favor of increasing processing speed. In other words, the parallel approach is quicker, but it is also more power hungry. On the other hand, in the serial approach, power consumption is reduced by only activating one location in the data array. However, the tag array and data array accesses must occur serially over multiple clock cycles in order to identify which location in the data array must be activated to fetch the desired data. In other words, the serial approach sacrifices processing speed in favor of reducing power consumption.

BRIEF DESCRIPTION OF THE DRAWINGS

FIG. 4 shows an encoding of least-recently-used bits that identifies a least-recently-used way in a cacheline set of an instruction cache.

FIG. 5 shows an encoding of least-recently-used bits that identifies a most-recently-used way in a cacheline set of an instruction cache.

FIG. 7 shows a timeline of example instruction cache operation according to the present disclosure.

DETAILED DESCRIPTION

The present discussion sets forth novel systems and methods for controlling an instruction cache of a microprocessor in such a manner that power consumption is reduced without significantly reducing performance of the microprocessor. More particularly, the present discussion relates to optimizing control of an instruction cache by determining a most-recently-used (MRU) way (or address) from a set of ways in the instruction cache that is specified in an instruction fetch. The information about the MRU way is used to efficiently access the instruction cache by only activating the MRU way and not activating the other ways in the cacheline set to retrieve data stored at the MRU way. In this way, if there is a cache hit at the MRU way, the amount of power consumed to look up the data in the instruction cache may be decreased relative to implementations where all ways in a set are activated to retrieve data from a single way. Moreover, the MRU way can be looked up in parallel with the tags of a cacheline set to provide faster performance relative to a serial approach.

On the other hand, if there is a hit in one of the ways in the set other than the MRU way, then the data is not available due to the limited activation of the MRU way, and another way in the set is subsequently activated to retrieve the data. This replay of the cache lookup generally lowers performance as it effectively increases the instruction cache hit latency. However, the frequency of this type of event is rare enough that the overall power savings outweighs the minor reduction in performance as compared to the parallel lookup approach. The performance when this type of event happens is similar to the serial lookup approach.

Furthermore, if there is not a hit of any way in the set (i.e., cache miss), there is no change of behavior of the instruction cache relative to other implementations, as the data needs to be retrieved from a higher level cache. In other words, when a cache miss occurs, there is no performance penalty relative to the instruction cache control approach where all ways in a set are activated to retrieve the data, and, the power consumption is still lower than the parallel lookup approach.

Figure 1:
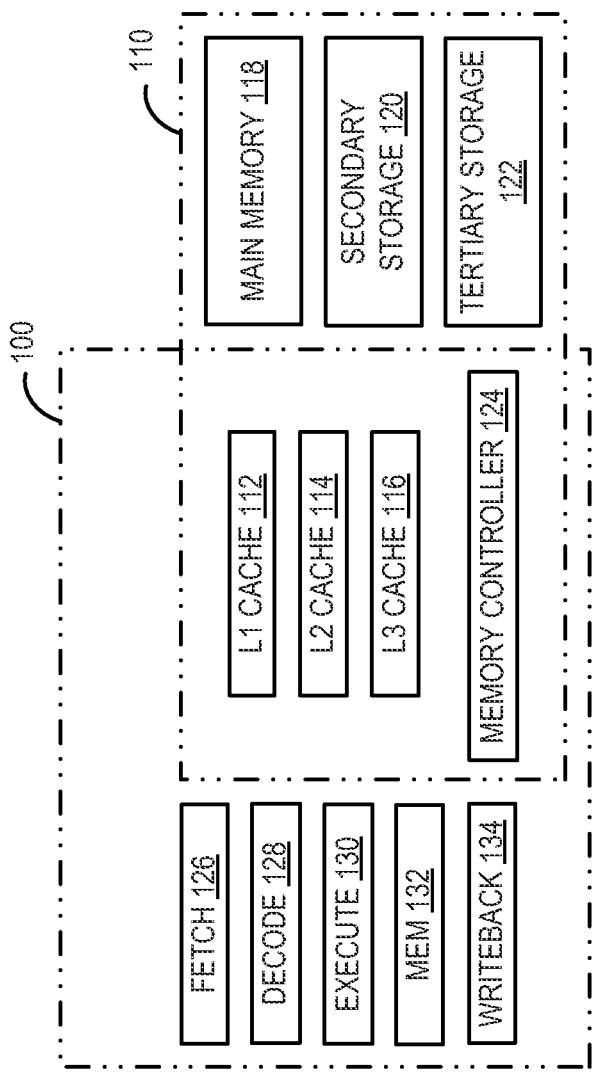
FIG. 1 shows an embodiment of a microprocessor of a computing device according to the present disclosure.

FIG. 1 schematically depicts a microprocessor 100 that may be employed in connection with the systems and methods described herein. The microprocessor 100 variously includes and/or communicates with a memory hierarchy 110, which includes an L1 processor cache 112, an L2 processor cache 114, an L3 processor cache 116, main memory 118 (e.g., one or more DRAM chips), secondary storage 120 (e.g., magnetic and/or optical storage units) and/or tertiary storage 122 (e.g., a tape farm). It will be understood that these memory/storage components are listed in increasing order of access time and capacity, though there are possible exceptions. A memory controller 124 handles the protocol and provides the signal interface required of main memory 118 and typically to schedule memory accesses. The memory controller can be implemented on the processor die or on a separate die. It is to be understood that the memory hierarchy provided above is non-limiting and other memory hierarchies may be used without departing from the scope of this disclosure. The depicted memory hierarchy is an exemplary illustration, and it will be understood that other hierarchies may be employed without departing from the spirit of the present disclosure.

The microprocessor 100 includes fetch logic 126, decode logic 128, execution logic 130, mem logic 132, and writeback logic 134. Fetch logic 126 retrieves instructions from the memory hierarchy 110 (typically from the dedicated L1 instruction cache backed by L2-L3 caches and main memory) for storage in an instruction cache 216 (shown in FIG. 2). The instruction cache 216 may be controlled according to systems and methods described herein in order to reduce power consumption by the microprocessor 100 when performing instruction fetch operations.

Decode logic 128 decodes fetched instructions, for example by parsing opcodes, operands, and addressing modes. Upon being parsed, the instructions are then executed by execution logic 130. For operations that produce a result (for example, as opposed to those that perform a branch to another location in the executing program), writeback logic 134 writes the result to an appropriate location, such as a processor register. In load/store architectures, mem logic 132 performs load and store operations, such as loading an operand from main memory into a processor register.

It should be understood that the above five stages are somewhat specific to and included in a typical reduced instruction set computing (RISC) implementation. More generally a microprocessor may include fetch, decode, and execution logic, with mem and write back functionality being carried out by the execution logic. The present disclosure is equally applicable to these and other microprocessor implementations.

In the described examples, instructions may be fetched and executed one at a time, possibly requiring multiple clock cycles. During this time, significant parts of the data path may be unused. In addition to or instead of single instruction fetching, pre-fetch methods may be used to improve performance and avoid latency bottlenecks associated with read and store operations (i.e., the reading of instructions and loading such instructions into processor registers and/or execution queues). Moreover, multiple instructions may be fetched at any given time to improve performance.

Figure 2:
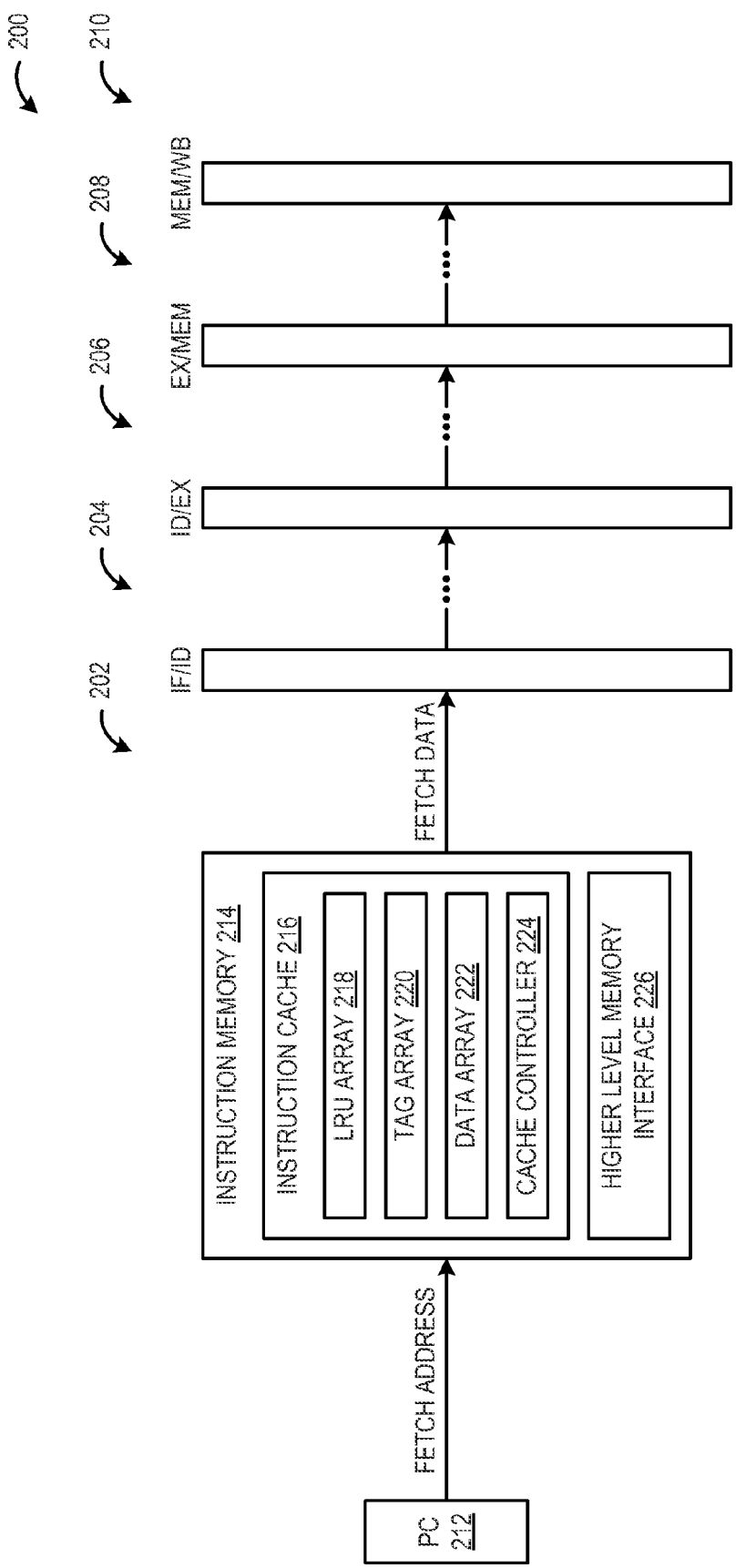
FIG. 2 shows an embodiment of a computer processing pipeline according to the present disclosure.

To achieve higher performance, the exemplary microprocessors may be pipelined to exploit instruction level parallelism and more efficiently utilize the data path so that there are multiple instructions in different stages of execution at the same time. FIG. 2 shows an embodiment of a processing pipeline 200 according to the present description.

For example, the processing pipeline 200 includes five stages:
Instruction fetch (IF) 202
Instruction decode (ID) 204
Execute (EX) 206
Memory (MEM) 208
Writeback (WB) 210

In the IF stage 202, an instruction is fetched for execution in the processing pipeline 200. Furthermore, in the ID stage 204, the previously fetched instruction is decoded and register source operands are read from decode logic including a register file. In the EX stage 206, execution logic is used to either compute a result (e.g. for an "ADD" instruction), calculate the effective address for a memory operation (e.g. a "LOAD" or "STORE"), or calculate a branch target address (e.g. for a "branch" instruction) where the processing pipeline 200 should fetch its next instruction if a branch is taken. In the MEM stage 208, load and store instructions access the data memory (or caches). During the WB stage 210, any instructions with a register destination operand (e.g. "ADD" or "STORE") write their result to a register file (not shown). Thus, one instruction might be writing results back to an internal register while another instruction is reading or writing data, the instruction immediately following is executing an operation, and the instruction following that is retrieving register operands while still another instruction is being fetched.

Turning specifically to the IF stage 202, the present discussion focuses on controlling an instruction cache 216 during an instruction fetch operation. The IF stage 202 includes a program counter 212 that keeps track of a memory address of an instruction to be executed in an instruction sequence of the processing pipeline 200. The program counter 212 sends an address of an instruction to be executed to an instruction memory 214. The instruction memory 214 includes an instruction cache 216 and an interface to higher level memory storage 226 (e.g., higher level cache and other memory subsystems). Note that the instruction memory is presented in a simplified form and it will be appreciated that the instruction memory may additionally or alternatively include various other types of memory.

The instruction cache 216 acts as a buffer memory between the higher level memory storage interface 226 and the stages of the processing pipeline 200. When instructions are fetched, the data at the location reference by the program counter 212 locations requested by the instructions is copied into the instruction cache 216 to be sent through the processing pipeline 200. If the same instruction data is used frequently in a set of program instructions, storage of these instructions in the instruction cache 216 yields an increase in throughput because retrieval of instructions from higher level memory storage via the interface 226 is reduced. If data for an instruction is not stored in the instruction cache 216, higher level memory storage is accessed via the interface 226 to retrieve the data.

Figure 3:
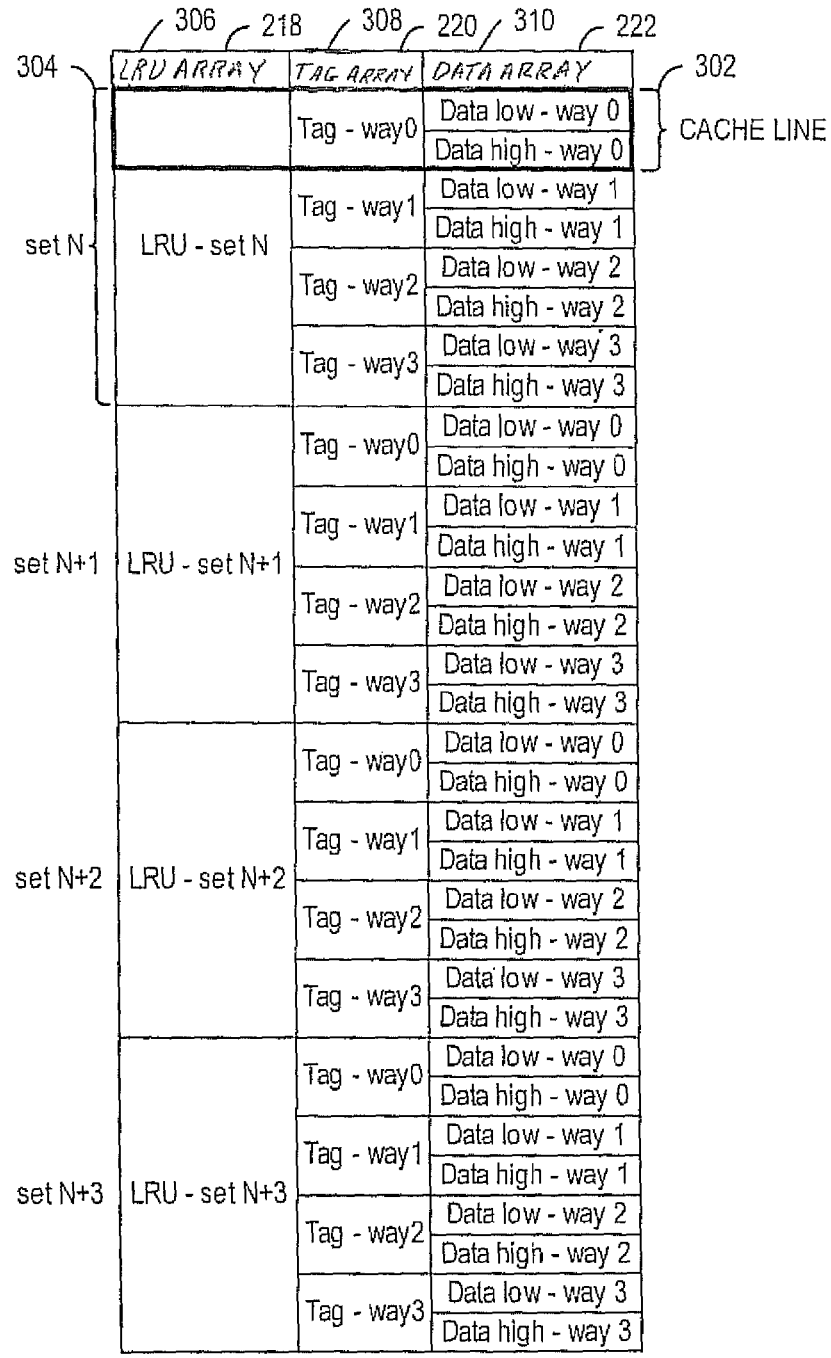
FIG. 3 schematically shows a portion of an embodiment of an instruction cache.

FIG. 3 shows a portion of the instruction cache 216, and will be referred to herein for discussion of the instruction cache 216. The instruction cache 216 includes a memory space that is divided into a plurality of cachelines, an example of which is indicated at 302. In one particular example, each cacheline is sixty four bytes. The plurality of cachelines is logically divided into a plurality of cacheline sets, an example of which is indicated at 304. In one particular example, the instruction cache includes five hundred twelve cacheline sets, four (i.e., sets N-N+3) of which are shown in FIG. 3. It will be appreciated that the instruction cache may include any suitable number of cacheline sets, each of the cachelines may be any suitable size, and a number of bytes in each cacheline may be different without departing from the scope of the present disclosure.

The number of cachelines in a cacheline set may define the number of locations in the instruction cache to which any particular location in main memory can be mapped. In the illustrated example, the instruction cache includes a four-way set associative array, where each set of cachelines is associative and includes four ways where instruction data can be stored. It will be appreciated that the instruction cache may include any suitable number of ways or data locations in a cacheline set (e.g., two-way, eight-way, fully associative, etc.) without departing from the scope of the present disclosure.

Each cacheline of the instruction cache 216 is divided into different bit fields that provide different information. Specifically each cacheline of the instruction cache 216 includes least-recently-used (LRU) bits 306, tag bits 308, and data bits 310. The LRU bits 306 indicate a least-recently-used (or accessed) way in a cacheline set. The tag bits 308 identify a designated way where an instruction corresponding to the address is stored. The data bits 310 store the instruction data. In the illustrated example, the data bits 310 of each cacheline are split into a low half and a high half, because each instruction fetch read of the instruction cache retrieves a half of a cacheline of data if there is a hit. It will be appreciated that any suitable amount of data may be retrieved during an instruction fetch read without departing from the scope of the present disclosure.

The different bit fields of each of the cachelines are organized into different arrays that are controlled by a cache controller 224. Specifically, the instruction cache 216 includes an LRU array 218, a tag array 220, and a data array 222. The LRU array 218 includes the LRU bits 306 for each cacheline set in the instruction cache 216. The tag array 220 includes the tag bits 308 for each cacheline in the instruction cache 216. The data array 222 includes the data bits 310 for each cacheline in the instruction cache 216.

The cache controller 224 is configured to look up (a.k.a., access, or activate) any designated location in any of the LRU array 218, tag array 220, and/or the data array 222 to retrieve the corresponding bits, throughout an instruction fetch operation. It will be appreciated that the instruction cache is provided in simplified form, and in some implementations, the instruction cache may include alternative or additional array structures that hold additional data without departing from the scope of the present disclosure.

At a high level, during an instruction fetch operation when the program counter 212 initiates an instruction fetch request, the cache controller 224 determines a cacheline set where an instruction may be stored based on the address received from the program counter 212. In one example, the cache controller 224 activates all four ways of the tag array 220 and all of the ways of the data array 222 for the cacheline set to determine whether there is a hit or miss in the cacheline set. Note that in some implementations, the cache controller 224 activates the tag array 220 and the data array 222 in parallel to determine if there is a hit and to retrieve the instruction data if there is a hit at the same time. For cache hits, the cache controller 224 outputs the instruction data from the instruction cache 216 to a register in the ID stage 204 of the processing pipeline 200. In subsequent clock cycles after a cache hit, the cache controller 224 fetches instructions from sequential entries in the instruction cache until a pipeline stall occurs, or until there is a redirection due to a branch or event.

For cache misses, the instruction is retrieved from the main memory 226 and placed in a cacheline of the instruction cache 216. The cache controller 224 employs the LRU bits 306 of the specified cacheline set to select a way for eviction so that the instruction retrieved from the main memory 226 can be stored in the instruction cache 216. For example, the least-recently-used way as indicated by the LRU bits 306 may be selected for eviction so that the requested instruction can be stored in its place.

FIG. 4 shows an example of an encoding 400 of LRU bits that is used by the cache controller 224 to identify a least-recently-used way in a cacheline set. The encoding or pseudo-LRU algorithm 400 employs a 3-bit vector to keep track of which of four ways in a cacheline set is least recently used. For example, the cache controller 224 updates the LRU bits in the encoding 400 on reads of the instruction cache 216 that hit one of the ways in the following manner. The L[0] bit and either L[1] or L[2] bits are pointed away from the way that was most recently used. The other L[1] or L[2] bit is left unchanged. Accordingly, if Way 0 is the least-recently-used way of the set, then the L[0] bit is set to 0, the L[1] bit is set to 0, and the L[2] bit does not matter or is not taken into consideration. If Way 1 is the least-recently-used way of the set, then the L[0] bit is set to 0, the L[1] bit is set to 1, and the L[2] bit does not matter. If Way 2 is the least-recently-used way of the set, then the L[0] bit is set to 1, the L[1] bit does not matter, and the L[2] bit is set to 0. If Way 3 is the least-recently-used way of the set, then the L[0] bit is set to 1, the L[1] bit does not matter, and the L[2] bit is set to 1. The cache controller 224 updates the LRU bits with each cache hit to update the least-recently-used way. Further, the cache controller 224 reads the LRU bits with each cache miss to determine which way to select for eviction.

Furthermore, the LRU bits are employed in a control strategy for reducing power consumption during operation of the instruction cache 216. The control strategy recognizes that the processing pipeline 200 repeats execution of some instructions frequently throughout operation. Due to such repetition, there is a higher likelihood that a requested instruction is stored in a most-recently-used way relative to other ways in a cacheline set. Accordingly, the cache controller 224 is configured to determine a most-recently-used (MRU) way in a designated cacheline set based on the LRU bits 306. The cache controller 224 uses the most-recently-used way to efficiently access the instruction cache 216 when fetching sequential entries. For example, when sequentially fetching a next instruction, the cache controller 224 is configured to activate a location in the data array 222 that corresponds to the most-recently-used way as opposed to activating all ways in the set to retrieve an instruction. In this way, the amount of power that is consumed to look up data in the instruction cache 216 is reduced relative to other approaches that activate all ways in a set to retrieve data from a single way.

FIG. 5 shows an example encoding 500 of MRU bits for a cacheline set that is based on the LRU bits of the cacheline set. The encoding 500 is used by the cache controller 224 to track the most-recently-used way in the cacheline set. In particular, the MRU encoding 500 is determined by flipping the bits of the LRU encoding 400. In other words, the LRU bits 306 may be used to determine both a most-recently-used way and a least-recently-used way for a designated cacheline set. According to the MRU encoding 500, if Way 0 is the most-recently-used way of the set, then the L[0] bit is set to 1, the L[1] bit is set to 1, and the L[2] bit does not matter or is not taken into consideration. If Way 1 is the most-recently-used way of the set, then the L[0] bit is set to 1, the L[1] bit is set to 0, and the L[2] bit does not matter. If Way 2 is the most-recently-used way of the set, then the L[0] bit is set to 0, the L[1] bit does not matter, and the L[2] bit is set to 1. If Way 3 is the most-recently-used way of the set, then the L[0] bit is set to 0, the L[1] bit does not matter, and the L[2] bit is set to 0. The MRU encoding 500 provides one example of how the cache controller 224 may determine a most-recently-used way in a cacheline set. It will be appreciated that the cache controller may determine a most-recently-used way in a cacheline set in any suitable manner without departing from the scope of the present disclosure.

In one example implementation, the cache controller 224 is configured to look up LRU bits for four consecutive sets of cachelines in a single read operation of the LRU array 218 in a clock cycle. In other words, the LRU bits describe groups of four cacheline sets. The number of cacheline sets that correspond to the read operation is based on the implementation of the instruction cache, and more particularly, the number of LRU bits used to describe the ways in a cacheline set and the size of a cacheline. It will be appreciated that LRU bits for any suitable number of cacheline sets may be returned from a single read operation without departing from the scope of the present disclosure.

In one example, the cache controller 224 is configured to look up the LRU bits in parallel with an initial tag and data look up (e.g., that are performed after a redirection due to a branch operation) for an instruction fetch operation. Note that the number of clock cycles for the LRU access to be completed vary based on implementation. Assuming that the initial look up was not for a final set in the associated LRU entry and there was no subsequent redirection, then two clock cycles after the initial access the LRU bits are available for the cache controller 224. The cache controller 224 is configured to determine the most-recently-used way of the instruction look up (or access) that is about to begin and subsequent accesses based on the LRU bits. For these accesses, the cache controller 224 is configured to look up data stored in the most-recently-used way in the data array 222 to fetch the instruction. Correspondingly, the cache controller 224 is configured to not activate any other ways in the designated cacheline set of the data array 222. In other words, only the most-recently-used way of the data array 222 is activated to fetch the instruction.

Furthermore, the cache controller 224 is configured to look up, in the tag array 220, tags for all ways in the designated cacheline set to determine if there was a hit in any way of the designated cacheline set. In one example, the cache controller 224 is configured to perform the tag look up and the most-recently-used way data array look up in parallel. If there is a hit in the most-recently-used way, then the data is available from the activated data array, and the cache controller 224 is configured to output the data stored in the most-recently-used way. If there is a hit in one of the ways other than the most-recently-used way, then the data is not available due to the limited activation of the data array 222 of only the most-recently-used way. Subsequently, the cache controller 224 is configured to activate the corresponding portions of the tag array 220 and the data array 222 to fetch all tags and data from all ways in the designated cacheline set in order to fetch the instruction from the way that hit in the tag. This replay of the cache lookup generally lowers performance as it effectively increases the cache hit latency. If there is not a hit in any way in the designated cacheline set, the instruction is retrieved from main memory 226 or another higher level cache.

In this control strategy, the cache controller uses information derived from the LRU bits to predict a location where an instruction is stored and accesses only that location to retrieve the data in order to reduce power consumption. In particular, the control strategy dictates that the most-recently-used way in a cacheline set is the most likely location for the instruction to be stored. As such, the cache controller only activates the most-recently-used way of the data array to retrieve the data. If the prediction is correct, the power consumption is reduced relative to activating all ways in a cacheline set, and there is no performance penalty. If the prediction is incorrect then an additional access is required to retrieve the data due to the limited activation of the data array.

Note that in some cases, the LRU bits are looked up prior to when the LRU bits would otherwise be looked up for the purpose of updating the LRU based on a cache hit. In this example, the LRU array is looked up two clock cycles before the first sequential access to a new LRU data entry where the LRU bits would be used. Further note that in this example, data is available two clock cycles after a look up is performed by accessing one of the arrays. It will be appreciated that the processing speed or number of clock cycles to retrieve data may differ without departing from the scope of the present disclosure.

Figure 6:
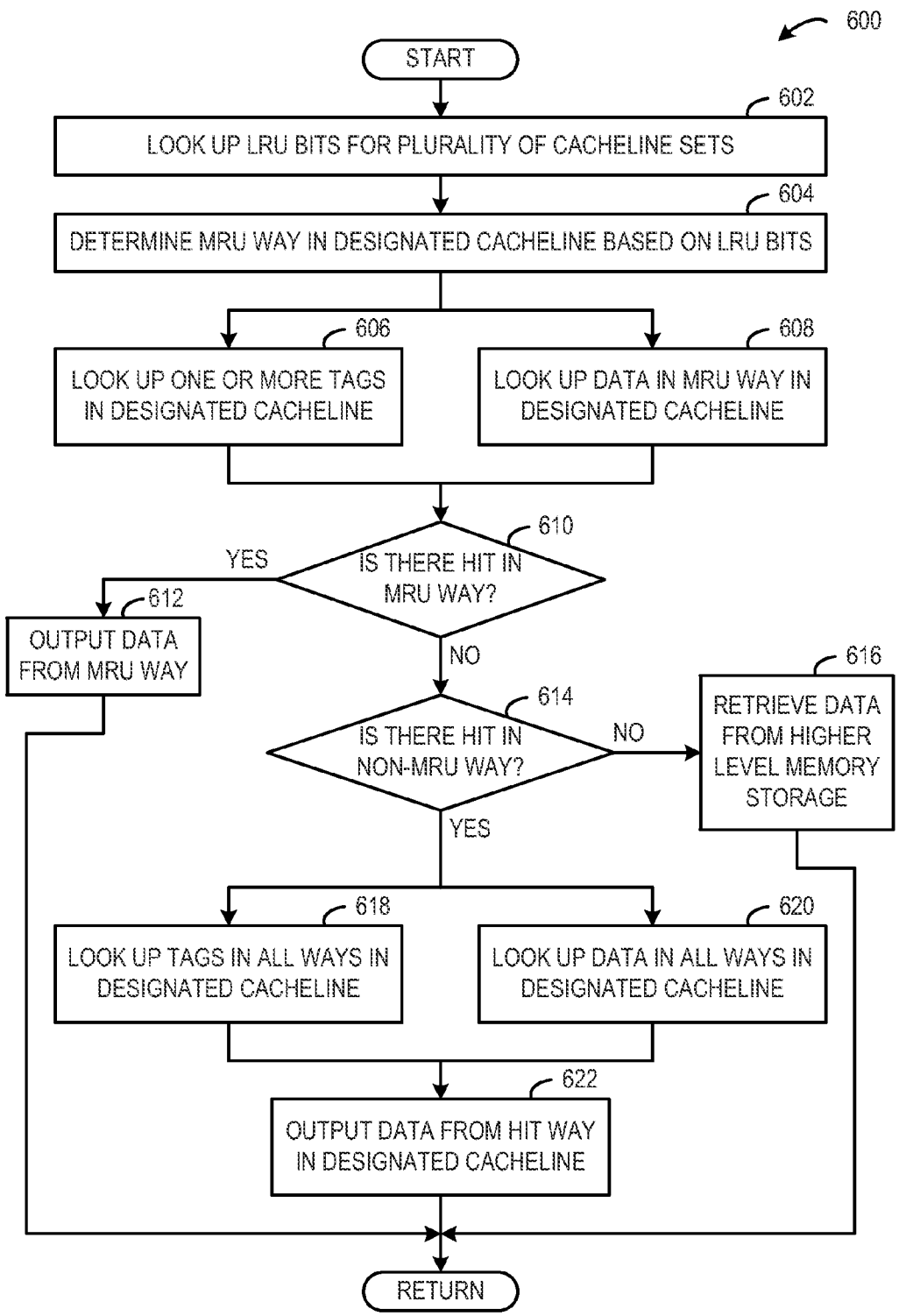
FIG. 6 shows an embodiment of a method for controlling an instruction cache.

FIG. 6 shows an embodiment of a method 600 for controlling an instruction cache. In one example, the cache controller 224 shown in FIG. 2 is configured to perform the method 600 to control operation of the instruction cache 216 including accessing the LRU array 218, the tag array 220, and the data array 222. At 602, the method 600 includes looking up, in the least-recently-used bits array, least-recently-used bits for each of a plurality of cacheline sets in the instruction cache. Looking up the LRU bits includes activating the portion of the LRU array that corresponds to plurality of cacheline sets. In one example, the plurality of cacheline sets represents sequential entries in the instruction cache. A designated set in the sequence of entries may be specified by an address provided from an instruction fetch operation. In one particular example, looking up the least-recently-used bits includes looking up least-recently-used bits for each of four sequential cacheline sets in the instruction cache. The LRU bits for sequential cacheline sets may be looked up prior to fetching an instruction from one of the cacheline sets in order to predict the way in the set where the instruction is stored.

At 604, the method 600 includes determining a most-recently-used way in a designated cacheline set of the plurality of cacheline sets based on the least-recently-used bits for the designated cacheline. In one example, the designated cacheline set is the set in which an instruction that is currently being fetched is stored. In one example, the MRU way may be determined using a 3-bit vector to track which way is most recently used, as discussed above with reference to encoding 500 and FIG. 5.

At 606, the method 600 includes, in one example, looking up, in the tag array, tags for all ways in the designated cacheline set. All tags in the cacheline set are activated to determine if there is a cache hit in any of the ways in the designated cacheline set.

Alternatively, in another example, the method 600 includes looking up, in the tag array, the most-recently-used way in the designated cacheline set. If there is a hit, there are no performance penalties. However, if there is a miss, the cache controller does not know whether the data is in the instruction cache in a different way or not in the instruction cache at all. So, after a miss, a second look up of the tag array including all ways may be performed to determine if the data is in another way, or whether it needs to be retrieved from higher level memory storage.

At 608, the method 600 includes looking up, in the data array, data stored in the most-recently-used way in the designated cacheline set. More particularly, looking up, in the data array, data stored in the most-recently-used way in the designated cacheline set includes activating the most-recently-used way of the data array and not activating any other ways of the data array in the designated cacheline set. By not activating the other ways of the data array in the designated cacheline set power consumption may be reduced during an instruction fetch operation relative to an approach where all ways are activated to retrieve data from a single way.

In one example, the tag look up and the data look up are performed in parallel. By performing these operations in parallel the instruction fetch operation may be performed more quickly to improve processing performance relative to a serial approach.

Note that looking up, in the least-recently-used bits array, least-recently-used bits for each of the plurality of cacheline sets is performed prior to looking up, in the tag array, the tags for all ways in the designated cacheline set and looking up, in the data array, the data stored in the most-recently-used way. By looking up the LRU bits prior to the tag and data lookups a prediction of where the instruction is stored (i.e., the MRU way) can be made so that the data array may be efficiently activated in order to reduce power consumption.

In one example, looking up, in the least-recently-used bits array, least-recently-used bits for each of the plurality of cacheline sets is performed two clock cycles prior to looking up, in the tag array, the tags for all ways in the designated cacheline set and looking up, in the data array, the data stored in the most-recently-used way. It will be appreciated that the LRU bits may be looked up any suitable number of clock cycles prior to the tag and data lookups without departing from the scope of the present disclosure.

At 610, the method 600 includes determining if there is a cache hit in the MRU way. The determination may be made based on the tags that were looked up for one or more ways of the designated cacheline set. If it is determined that there is a cache hit in the MRU way, the method 600 moves to 612. Otherwise, the method 600 moves to 614.

At 612, there is a cache hit in the MRU way, and the method 600 includes outputting the data stored in the most-recently-used way from the data array. The data represents the instruction requested by the instruction fetch operation. In one example, the data is output to an instruction decode stage of a processing pipeline.

At 614, the method 600 includes determining if there is a cache hit in any other way besides the MRU way in the designated cacheline set. If it is determined that there is a cache hit in any other way besides the MRU way in the designated cacheline set, the method 600 moves to 618 and 620. Otherwise, the method 600 moves to 616.

At 616, the method 600 includes retrieving instruction data from a higher level cache or other memory storage. In one example, the data is retrieved from the higher level cache or other memory storage through interface 226.

At 618, the method includes looking up, in the tag array, tags for all ways in the designated cacheline set. The tags are looked up to determine whether there is still a cache hit in cacheline set.

At 620, the method 600 includes looking up, in the data array, data stored in all ways of the designated cacheline set.

In one example, the tag look up and the data look up during the replay are performed in parallel. By performing these operations in parallel the instruction fetch operation may be performed more quickly to improve processing performance.

At 622, the method 600 includes outputting the data from the hit way in the designated cacheline set.

FIG. 7 shows a timeline of example instruction cache operation according to the present disclosure. The timeline depicts an example pipeline of tag, data, and LRU array accesses during instruction fetch operations. In this example, for purposes of simplicity and clarity, each time a most-recently-used way is activated it is assumed there is a cache hit. Further, each instruction fetch read of the cache retrieves a half of a cacheline of data if there is a hit. In the timeline, time advances from left-to-right and subsequent instruction cache accesses advance from top-to-bottom, although some accesses may be performed in parallel.

In the first clock cycle, a redirection due to a branch has occurred causing an instruction fetch of the instruction cache. In the second clock cycle, all tags for the designated cacheline set (set 2) are looked up in the tag array, all low data ways for the cacheline set (set 2) are looked up in the data array, and the LRU bits for a group of four consecutive cacheline sets are looked up in the LRU array including the current cacheline set. Note that although LRU bits for a group of four consecutive cacheline sets are looked up, the designated cacheline set from which the current instruction is being fetched need not necessarily be the first cacheline set in the group. In the illustrated example, the designated cacheline set is the third cacheline set in the group (i.e., set 2 out of sets 0-3). The tag, data, and LRU look ups are performed in parallel in the second clock cycle. When a redirection due to a branch causes a fetch from the instruction cache, all ways of the data and tag arrays are activated to determine whether there was a hit in any of the ways in the cacheline set, and to return the correct data if there was a cache hit. The LRU array is activated to determine the MRU ways in the next four sequential cacheline sets.

In this example, data is available two clock cycles after a lookup is performed. While the data accesses from the second clock cycle are being processed, the next instruction fetch is performed. Specifically, in the third clock cycle, all tags and the high data ways are looked up for set 2. All tag and high data array locations are looked up because the MRU data is not yet available from the initial look up of the LRU array to perform a targeted look up of the MRU way.

In the fourth clock cycle, the instruction data and the LRU data from the accesses performed in the second clock cycle are available. Since the LRU bits are available, the MRU way of the instruction fetch that is about to begin can be determined as well as the MRU ways for subsequent accesses which use the same LRU data (i.e., the other sets in the group of four sequential cacheline sets). Specifically, only the MRU low data way of the data array is activated for the designated cacheline set (set 3), and the other ways are not activated. Further, all ways of the tag array are still activated to determine if there was a cache hit in any way of set 3. By only accessing the MRU low data way for set 3, the power consumption of the data array access may be reduced at no performance penalty when there is a cache hit. Furthermore, the LRU bits for the next four cacheline sets (i.e., set 4-7) are looked up in the fourth clock cycle in preparation for targeted look ups of MRU ways of sequential instruction fetches.

In the fifth clock cycle, the next instruction fetch is performed by looking up all tags for set 3 in the tag array and only looking up the MRU high data way for set 3 in the data array. Since the MRU high data way is known for set 3 from the LRU bits made available in the fourth clock cycle, a targeted look up of the MRU high data way is performed to reduce power consumption during the instruction fetch. Furthermore, the instruction data from the instruction fetch performed in the third clock cycle is available for propagation through stages further down the pipeline.

In the sixth clock cycle, the next sequential instruction fetch is performed by looking up all tags for set 4 in the tag array and only the MRU low data way for set 4 in the data array. Since the MRU low data way is known for set 4 from the LRU bits made available in the fourth clock cycle, a targeted look up of the MRU low data way is performed to reduce power consumption during the instruction fetch. Furthermore, the instruction data from the instruction fetch performed in the fourth clock cycle is available for propagation through stages further down the pipeline. Furthermore, a redirection occurs in the sixth clock cycle to another address.

In the seventh clock cycle, all tags for the designated cacheline set (set 8) are looked up in the tag array, all low data ways for the cacheline set (set 8) are looked up in the data array, and the LRU bits for a group of four consecutive cacheline sets (sets 8-11) are looked up in the LRU array including the current cacheline set. The data looked up in the seventh clock cycle is available in the ninth clock cycle. Instructions fetches may continue sequentially until a redirection due to a branch occurs.

The look ups performed in the fourth, fifth, and sixth clock cycles that are highlighted in FIG. 7 are targeted accesses of the MRU data ways. The power consumed by these accesses is reduced relative to instruction cache control strategies where all data ways are accessed to fetch an instruction from a single data way. Due to the highly repetitive nature of instruction fetches during operation of the instruction cache, the power consumption of the data array accesses during instruction fetches dominate the total instruction cache power consumption. By controlling the instruction cache according to the herein described power reduction strategy, the power consumption of a full CPU core may be reduced relative to an implementation which always activated all ways of the data array of an instruction cache during instruction fetches.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for controlling an instruction cache including a least-recently-used bits array, a tag array, and a data array, comprising:
   looking up, in the least-recently-used bits array, least-recently-used bits for each of a plurality of cacheline sets in the instruction cache, where least-recently-used bits for a cacheline set indicate a least-recently-used way in that cacheline set;
   determining a most-recently-used way in a designated cacheline set of the plurality of cacheline sets based on the least-recently-used bits for the designated cacheline;
   looking up, in the tag array, tags for one or more ways in the designated cacheline set, wherein the looking up tags for one or more ways in the designated cacheline set comprises looking up a tag associated with the most-recently-used way prior to looking up tags in the tag array for other ways in the designated cacheline set;
   looking up, in the data array, data stored in the most-recently-used way in the designated cacheline set; and
   in response to determining a cache hit in the most-recently-used way based on the tag array, activating only the most-recently-used way and outputting the data stored in the most-recently-used way from the data array.

2. The method of claim 1, where looking up, in the tag array, the tags for one or more ways in the designated cacheline set and looking up, in the data array, the data stored in the most-recently-used way are performed in parallel.

3. The method of claim 1, where looking up, in the least-recently-used bits array, least-recently-used bits for each of the plurality of cacheline sets is performed prior to (1) looking up, in the tag array, the tags for one or more ways in the designated cacheline set and (2) looking up, in the data array, the data stored in the most-recently-used way.

4. The method of claim 1, where looking up, in the data array, data stored in the most-recently-used way in the designated cacheline set includes (1) activating the most-recently-used way of the data array and (2) not activating any other ways of the data array in the designated cacheline set.

5. The method of claim 1, where looking up, in the tag array, the tags for one or more ways in the designated cacheline set includes looking up tags for all ways in the designated cacheline set.

6. The method of claim 5, further comprising:
   if there is a cache miss in all of the ways of the designated cacheline set, retrieving instruction data from a higher level memory storage.

7. The method of claim 1, where looking up in the tag array, the tags for one or more ways in the designated cacheline set includes looking up the tag for the most-recently-used way in the designated cacheline set and not looking up tags for other ways besides the most-recently-used way in the designated cacheline set.

8. The method of claim 1, further comprising:
   if there is a cache miss in the most-recently-used way, looking up, in the tag array, tags for all ways in the designated cacheline set;
   looking up, in the data array, data stored in all ways in the designated cacheline set; and
   if there is a cache hit in any of the ways in the designated cacheline set, outputting the data in the hit way from the data array.

9. The method of claim 8, further comprising:
   if there is a cache miss in all of the ways of the designated cacheline set, retrieving instruction data from a higher level memory storage.

10. The method of claim 8, where (1) looking up the tags for all ways in the designated cacheline set and (2) looking up the data stored in all ways in the designated cacheline set are performed in parallel.

11. An instruction cache comprising:
    a least-recently-used bits array;
    a tag array;
    a data array; and
    a cache controller configured to (1) look up, in the least-recently-used bits array, least-recently-used bits for each of a plurality of cacheline sets in the instruction cache, where least-recently-used bits for a cacheline set indicate a least-recently-used way in that cacheline set, (2) determine a most-recently-used way in a designated cacheline set of the plurality of cachelines sets based on the least-recently-used bits for the designated cacheline set, (3) look up, in the tag array, tags for one or more ways in the designated cacheline set, (4) look up, in the data array, data stored in the most-recently-used way in the designated cacheline set, and in response to a cache hit in the most-recently-used way based on the tag array, activate only the most-recently-used way and (5) output the data stored in the most-recently-used way from the data array, wherein the look up of tags for one or more ways in the designated cacheline set comprises looking up a tag associated with the most-recently-used way prior to looking up tags in the tag array for other ways in the designated cacheline set.

12. The instruction cache of claim 11, where the cache controller is configured to (1) look up, in the tag array, the tags for one or more ways in the designated cacheline set and (2) look up, in the data array, the data stored in the most-recently-used way in parallel.

13. The cache of claim 11, where the cache controller is configured to look up, in the least-recently-used bits array, least-recently-used bits for each of the plurality of cacheline sets prior to (1) looking up, in the tag array, the tags for one or more ways in the designated cacheline set and (2) looking up, in the data array, the data stored in the most-recently-used way.

14. The instruction cache of claim 11, where the cache controller is configured to (1) activate the most-recently-used way in the designated cacheline set of the data array and (2) not activate any other ways in the designated cacheline set of the data array to look up data stored in the most-recently-used way in the designated cacheline set.

15. The instruction cache of claim 11, where the cache controller is configured to look up, in the tag array, the tags for all ways in the designated cacheline set.

16. The instruction cache of claim 15, where the cache controller is configured to (1) if there is a cache miss in the most-recently-used way, look up, in the tag array, tags for all ways in the designated cacheline set, (2) look up, in the data array, data stored in all ways in the designated cacheline set, and (3) if there is a cache hit in any of the ways in the designated cacheline set, outputting the data in the hit way from the data array.

17. The instruction cache of claim 16, further comprising:
if there is a cache miss in all of the ways of the designated cacheline set, retrieving instruction data from a higher level memory storage.

18. A method for controlling an instruction cache including a least-recently-used bits array, a tag array, and a data array, comprising:
 looking up, in the least-recently-used bits array, least-recently-used bits for each of a plurality of cacheline sets in the instruction cache, where least-recently-used bits for a cacheline set indicate a least-recently-used way in that cacheline set;
 determining a most-recently-used way in a designated cacheline set of the plurality of cacheline sets based on the least-recently-used bits for the designated cacheline;
 looking up, in the tag array, tags for all ways in the designated cacheline set, wherein the looking up tags for all ways in the designated cacheline set comprises looking up a tag associated with the most-recently-used way prior to looking up tags in the tag array for other ways in the designated cacheline set;
 looking up, in the data array, data stored in the most-recently-used way in the designated cacheline set;
 if there is a cache hit in the most-recently-used way based on the tag array, activating only the most-recently-used way and outputting the data stored in the most-recently-used way from the data array;
 if there is a cache miss in the most-recently-used way, looking up, in the tag array, tags for all ways in the designated cacheline set;
 looking up, in the data array, data stored in all ways in the designated cacheline set; and
 if there is a cache hit in any of the ways in the designated cacheline set, outputting the data in the hit way from the data array.

19. The method of claim 18, further comprising:
if there is a cache miss in all of the ways of the designated cacheline set, retrieving instruction data from a higher level memory storage.

20. The method of claim 18, where looking up, in the least-recently-used bits array, least-recently-used bits for each of the plurality of cacheline sets is performed prior to (1) looking up, in the tag array, the tags for all ways in the designated cacheline set and (2) looking up, in the data array, the data stored in the most-recently-used way.

21. The method of claim 1, wherein the looking up data stored in the most-recently-used way in the designated cacheline set is performed before a determination of whether there is a cache hit in the most-recently-used way.

* * * * *